(12) United States Patent
Willis

(10) Patent No.: US 7,222,336 B2
(45) Date of Patent: May 22, 2007

(54) METHOD OF COMPILING BYTECODE TO NATIVE CODE

(75) Inventor: Ian Willis, Southampton (GB)

(73) Assignee: NXP B.V., Eindhoven (NL)

( * ) Notice: Subject to any disclaimer, the term of this patent is extended or adjusted under 35 U.S.C. 154(b) by 725 days.

(21) Appl. No.: 10/247,977

(22) Filed: Sep. 20, 2002

(65) Prior Publication Data
US 2003/0079208 A1  Apr. 24, 2003

(30) Foreign Application Priority Data
Oct. 19, 2001 (GB) ................................ 0125176.8

(51) Int. Cl.
G06F 9/45 (2006.01)
G06F 9/44 (2006.01)
H04N 7/173 (2006.01)

(52) U.S. Cl. ...................... 717/148; 717/139; 717/140; 717/153; 717/118; 725/100; 725/103

(58) Field of Classification Search ................ 717/148, 717/114, 116, 118, 120, 136, 139, 140, 151–153, 717/162–166; 719/315, 316, 331, 332; 718/1; 715/716–719; 725/1
See application file for complete search history.

(56) References Cited

U.S. PATENT DOCUMENTS 5,937,411 A * 8/1999 Becker ................. 707/103 R
6,012,068 A * 1/2000 Boezeman et al. ...... 707/104.1
6,061,520 A * 5/2000 Yellin et al. ................. 717/148
6,110,226 A * 8/2000 Bothner ....................... 717/153
6,282,702 B1 * 8/2001 Ungar ......................... 717/148
6,349,344 B1 * 2/2002 Sauntry et al. ............. 719/332
6,405,367 B1 * 6/2002 Bryant et al. ............... 717/115
6,446,254 B1 * 9/2002 Chapman et al. ........... 717/116
6,470,494 B1 * 10/2002 Chan et al. ................. 717/166
6,542,887 B1 * 4/2003 Abbott .......................... 707/2
6,633,892 B1 * 10/2003 Chan et al. ................. 707/204
2003/0009769 A1 * 1/2003 Hensgen et al. ............ 725/131
2005/0210145 A1 * 9/2005 Kim et al. ................... 709/231

OTHER PUBLICATIONS

Plezbert: "Continuous Compilation for Sofrware Development and Mobile Computing", Online, May 1996.
Plezbert, M.: "Does Just in Time = Better Late Than Never?" Conference Record of Popl '97: 24TH AMC SIGPLAN-SIGACT Symposium on Principles of Programming Language. Jan. 15-17, 1997 p. 120-131.

* cited by examiner

Primary Examiner—Antony Nguyen-Ba

(57) ABSTRACT

A method of compiling byte code into native code disclosed together with a server (100) and a receiving terminal (101) for the same. The method comprises the steps of transmitting byte code files containing byte code from a server to a receiving terminal; transmitting grouping information relating to the grouping of byte code files to the receiving terminal; and compiling byte code files received at the receiving terminal to native code. The byte code files are selected for compilation as a function of the grouping of byte code files.

22 Claims, 2 Drawing Sheets

METHOD OF COMPILING BYTECODE TO NATIVE CODE

FIELD OF INVENTION

This invention relates to a method of compiling byte code into native code and in particular where the byte code is contained in byte code files transmitted from a server to a receiving terminal for subsequent compilation.

BACKGROUND TO INVENTION

Digital Video Broadcasting (DVB) is an organization which undertakes standardization activities in the field of digital broadcasting (see http://www.dvb.org). DVB's Multimedia Home Platform (MHP) standard (ETSI reference TS 101 812, version 1.1.1, blue book reference A057 05/00) is a series of measures designed to promote the harmonized transition from analogue television (TV) to a digital interactive multimedia future. In particular, the MHP defines a generic, i.e. hardware independent, interface between interactive digital applications and the terminals on which those applications execute. This enables digital content providers to address all types of terminals ranging from low-end to high-end set top boxes, integrated digital TV sets and multimedia PCs. The MHP supports many kinds of applications including the following examples: electronic program guides, information services (enhanced teletext, news and stock tickers etc.), applications synchronized to TV content, gaming and e-commerce.

The DVB MHP standard and its composite elements are known and well documented, and therefore only those elements which relate to the present invention are elaborated upon hereafter.

Digital Storage Media Command and Control (DSM-CC) is employed in DVB's MHP as a toolkit for developing control channels associated with MPEG-1 and MPEG-2 streams. Principally defined in part 6 of the MPEG-2 standard (Extensions for DSM-CC), it enables amongst other things broadcast carousels to be defined. Such carousels are mechanisms for assembling data sets into a buffer which are played-out in a cyclic manner, i.e. broadcast periodically. For example, such a carousel may be used to broadcast all the application files including Java class files, textual information and graphical data required for the receiver to execute MHP applications.

The DSM-CC Object Carousel is used not only in DVB's MHP but also in some digital terrestrial television broadcasts including, for example, ONdigital, BBC TV and Channel 4 digital broadcasts in the UK.

MHP is based around a platform known as DVB-J and includes a virtual machine as defined in the Java Virtual Machine (JVM) specification from Sun Microsystems. Java provides a means of producing hardware independent, executable "byte code" which is executed on a JVM. Different hardware platforms can have different JVM implementations but all will execute the same byte code. This is ideal for broadcast environments such as digital TV, where applications can be written, compiled and broadcast to a variety of different set-top boxes or integrated digital TVs.

Java source code is compiled with a Java compiler into byte code and stored in class files, which can be executed by a JVM. With DVB's MHP, Java application class files are broadcast to a receiver using DSM-CC which may prescribe a corresponding file structure which can then be replicated to store or cache the class files at the receiver. In addition, the DSM-CC may be used to defining modules comprising groups of related Java class files and other files for broadcast.

In the first JVM implementations, the byte code was interpreted however modern JVMs compile the byte code into faster executing, native instructions. Such compilation may typically occur in any of the following ways:

Just in Time (JIT)

This is where byte code is compiled to native code either when a class file is loaded or a method (a section of byte code which performs a certain function) within a class file is executed. A disadvantage of JIT implementations is that the JVM must spend an amount of time compiling a class or method when it is first accessed. During this time the JVM waits until the compilation is completed, pausing the execution of the Java application. Typically the more optimization that is performed by the compiler the larger the latency, but the faster the native code will run.

Runtime Analysis

These are based on an interpreted JVM. The JVM takes measurements at runtime and assesses which classes or methods would produce the best performance gain if they were compiled. This could include measuring the number of times a class or method is used and the amount of time spent executing byte code from that class or method. Once identified these can be compiled in the foreground (introducing latency) or compiled in the background, using otherwise wasted processor time. JVMs using this technology have less latency when new class files are loaded or previously unused methods are executed than JIT implementations, but run at a slower speed since some interpretation is always performed. The storage of runtime information has a small overhead on the execution speed. This technique requires both a byte code interpreter and a byte code to native code compiler.

Ahead of Time (AOT)

The byte code is processed after compilation and a new class file is produced. The new class file contains native implementations of methods. The JVM recognizes these native implementations and uses them instead of byte code. Typically better optimizations can be performed by AOT time compilation than JIT since compile time does not hold up the execution of the Java application. The native code is specific to a single processor, thus AOT compilation is not well suited to a broadcast environment since there is likely to be wide range of processors used by different receiver manufacturers.

OBJECT OF INVENTION

It is an object of the invention to provide an alternative and efficient method of compiling byte code contained in byte code files transmitted from a server to a receiving terminal into native code.

SUMMARY OF INVENTION

According to the present invention, such a method comprising the steps of transmitting byte code files containing byte code from a server to a receiving terminal, e.g. using a broadcast carousel; transmitting grouping information relating to the grouping of byte code files to the receiving terminal; and compiling byte code files received at the receiving terminal to native code, wherein the byte code files are selected for compilation as a function of the grouping of byte code files. After compilation, the byte code files may be cached in a memory for subsequent execution.

The method of the present invention enables selected byte code to be compiled ahead of time whilst still retaining platform independence, and without the latency associated with JIT compilation or run-time analysis.

The grouping information may relate to the grouping of the byte code files for transmission; the directory structure of the byte code files as stored at the server; or the directory structure to be used to store the byte code files at the receiving terminal.

In the case of the first option, the byte code files may be selected for compilation upon either the interpretation, compilation or execution of other byte code files transmitted in the same group. For example, such grouping information may be described using DSM-CC protocols of the DVB's MHP standard.

In the case of the later two options, a single group would typically relate to a single directory such that byte code files may then be selected for compilation upon the interpretation, compilation or execution of other byte code files residing in the same directory.

Again in the case of the later two options, the grouping information may comprise file locations appended to the file name of each respective byte code file, i.e. a new use of information which is conventionally already broadcast.

Further provided in accordance with the present invention is a server as claimed in claims 14 to 18 and receiving terminal as claimed in claims 19 to 27.

BRIEF DESCRIPTION OF DRAWINGS

The present invention will now be described, by way of example only, with reference to the accompanying schematic figures in which.

DETAILED DESCRIPTION

Figure 1:
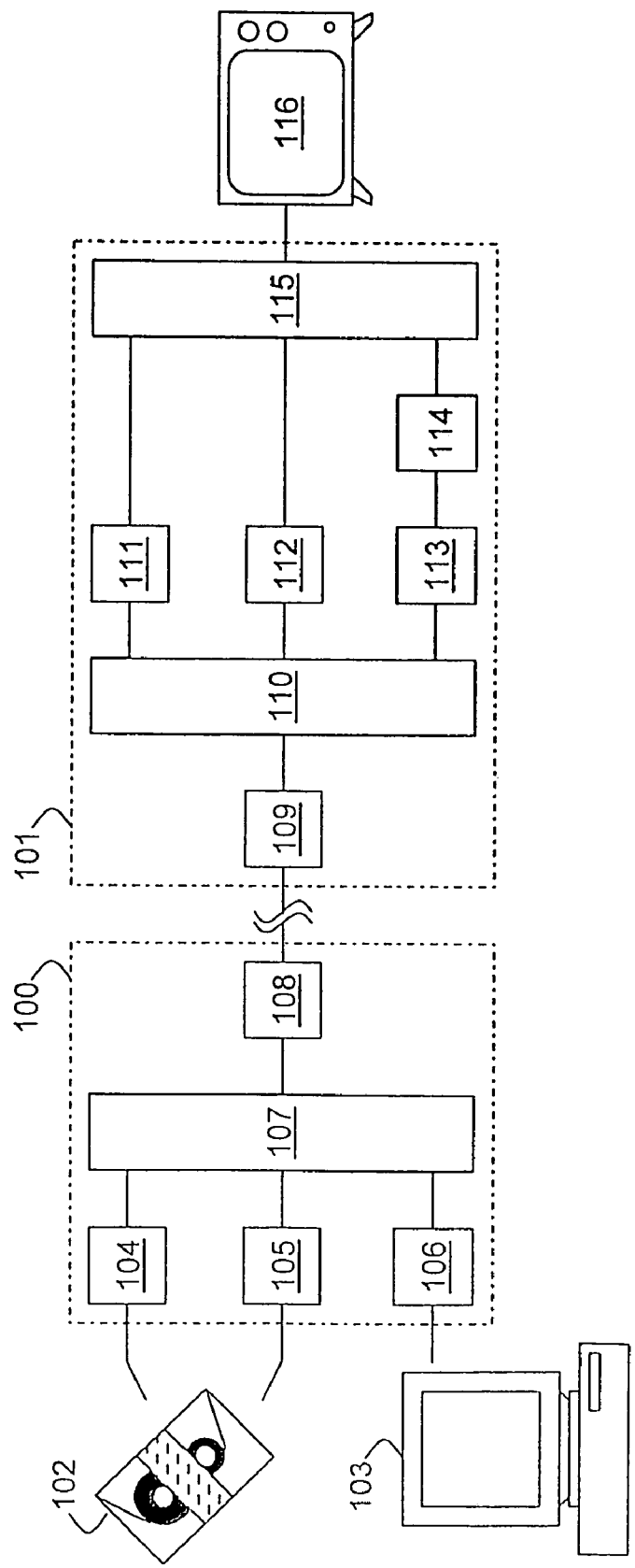
FIG. 1 shows a TV broadcasting system and corresponding receiving system configured in accordance with the present invention.

FIG. 1 shows a TV broadcasting system 100 adapted to transmit TV audio and video data together with ancillary application data to a corresponding receiving system 101 in accordance with the DVB's MHP standard. For example, the TV broadcasting system may be a satellite broadcasting system belonging to a commercial satellite broadcaster and the receiving system may be one of many corresponding combinations of a satellite receiving dish and a set-top box for processing the received data for display on a TV 116. Equally, the broadcasting system and corresponding receiving system could be terrestrially based. In either case, the design, manufacturing and operation of such systems are well known and those parts which do not relate to the present invention will not be elaborated upon here further.

Through audio 105, video 104 and data 106 inputs, the broadcasting system 100 is fed audio and video data steams from storage media 102 containing pre-recorded audio and video TV content and an application data stream from a computer 103 comprising Java class files and related graphics files. The application data is for providing an enhanced data/teletext service (not shown) which includes ancillary information associated with the audio and video content, and through which information the user can navigate whilst the audio and video data is displayed at the same time.

The audio, video and data streams are multiplexed in a multiplexer 107 before being broadcasted using a transmitter 108 over a single channel to corresponding receiving systems. In the receiving system shown, the incoming transmissions are receiver by a receiver 109, demultiplexed in a demultiplexer 110 and audio, video and application data streams are outputted through respective audio 112, video 111 and data 113 outputs. Display data derived from the application data is then feed with the audio and video data in to a TV signal processing unit 115 from which a corresponding TV signal is outputted for display on a TV 116.

The Java class files of the application data may be provided for, amongst other things, generating windows in which to display the ancillary information associated with the audio and video content, and associated graphics files may be provided for aesthetics including for displaying decorative framing windows and menu navigation options. An example of such an enhanced data/teletext service might be where the audio and video content represents a performing pop group and the application data provides a data/teletext service with a web style interface to be displayed in a window over part of the audio and video display, and in which fans of the pop group may peruse pages of information details forthcoming concerts, gossip and the like.

Certain Java class files will be related to each other to the extent that the interpretation or compilation of one class file will result or is likely in the interpretation or compilation of another. I.e. one class file is likely to call for execution another. This information could be obtained by run-time analysis at the receiver but as previously stated, this introduces latency. Fortunately however, upon authoring the application data, it will be appreciated which class files are so related and these class files can be grouped accordingly. In accordance with the present invention, these groupings are identified by the receiving system whereby certain class-files are pre-compiled and cached in a memory for later execution upon either the interpretation, compilation or execution of other byte code files in the same group.

The groupings of the class files may be conveyed to the receiving system in accordance with either of the following examples:

EXAMPLE 1

Figure 2:
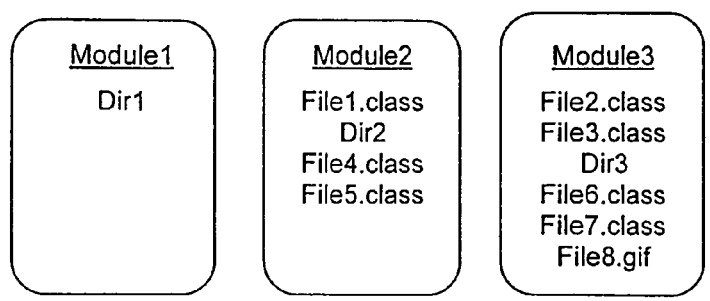
FIGS. 2 and 3 shows respective directory and module grouping structure of Java class files and other related files as utilized by the broadcasting system of FIG. 1.

The grouping is defined in relation to the arrangement of the byte code files during transmission. Such grouping may be defined using the DSM-CC of DVB's MHP which is able to group class files and other files in to modules for broadcast wherein the contents of a module are associated with a particular application. For example, referring to FIG. 2, module 1 contains a list of all the class files in directory "dir1"; module 2 contains class files "file1.class", "file4.class", "file5.class" and a list of class files in directory "dir2"; and module 3 contains class files "file2.class", "file3.class", "file6.class", "file7.class" and a list of all class files in directory "dir2", and also graphics file "file8.gif". Byte code files may then be selected for compilation upon either the interpretation, compilation or execution of other byte code files transmitted in the same group.

EXAMPLE 2

Figure 3:
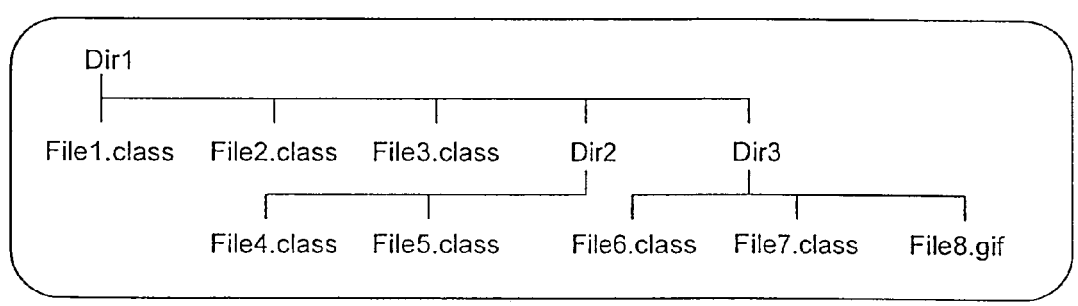

The grouping is defined by the directory structure of the byte code files as stored at the server prior to transmission, and whereby a single group corresponds to a single directory. In this case, the grouping information may be distributed amongst the byte code files in that it may comprise file locations appended to the file name of each respective byte code file. For example, referring to FIG. 3, the directory structure shown may correspond to 3 groups of class files, group 1 corresponding to directory "dir1" which contains all the class files; group 2 corresponding to "dir2" which contains class files "file4.class" and "file5.class"; and group 3 corresponding to "dir3" which contains class files "file6.class" and "file7.class". In this case, a given class file can belong to more than one group although it need only be broadcast once. Byte code files may then be selected for compilation whereby those class files in the groups corresponding to directories "dir2" and "dir3" are selected upon the interpretation, compilation or execution of other byte code files residing in the same directory; and upon compilation of class files "file1.class", "file2.class" and "file3.class" (i.e. those in directory "dir1" but not directories "dir2" or "dir3"), all the class files in directory "dir1" (including those in "dir2" and "dir3") are compiled.

EXAMPLE 3

Similar to example 2 except that the grouping is defined by the directory structure to be used to store the byte files at the receiving terminal which need not be the same as the directory structure of the files as stored at the server.

EXAMPLE 4

The grouping is defined by additional information transmitted with the class files and provided specifically for the sole purpose of defining groups of class files for efficiently compilation.

The embodiments above describe the invention primarily in the context of a broadcast system broadcasting byte code on a carousel. However, the invention is equally applicable to other arrangements where byte code is transmitted to a receiving system including Internet transfers of Java applets and the like.

The invention claimed is:

1. A method of compiling byte code into native code comprising the steps of: transmitting byte code files containing byte code from a server to a receiving terminal; transmitting grouping information relating to the grouping of byte code files to the receiving terminal; and compiling byte code files received at the receiving terminal to native code, wherein the byte code files are selected for compilation as a function of the grouping of byte code files, wherein interpretation, compilation or execution of one byte code file in a group triggers compilation of another byte code file in that group.

2. A method according to claim 1 wherein the grouping information relates to the grouping of the byte code files for transmission.

3. A method according to claim 2 wherein the grouping information is defined using the Digital Storage Media Command and Control (DSM-CC) protocols of the Digital Video Broadcasting's Multimedia Home Platform standard.

4. A method according to claim 1 wherein the grouping information relates to the directory structure of the byte code files as stored at the server whereby a single group relates to a single directory.

5. A method according to claim 4 wherein the grouping information comprising file locations appended to the file name of each respective byte code file.

6. A method according to claim 4 wherein the byte code files are grouped in directories, and the byte code files within a particular directory selected for compilation are done so upon the interpretation, compilation or execution of other byte code files residing in that same directory.

7. A method according to claim 1 wherein the grouping information defines the directory structure to be used to store the byte code files at the receiving terminal whereby a single group relates to a single directory.

8. A method according to claim 7 wherein the grouping information comprising file locations appended to the file name of each respective byte code file.

9. A method according to claim 7 wherein the byte code files are grouped in directories, and the byte code files within a particular directory selected for compilation are done so upon the interpretation, compilation or execution of other byte code flies residing in the same directory.

10. A method according to claim 1 wherein the server transmits byte code files to the receiving terminal using a broadcast carousel.

11. A method according to claim 1 wherein the byte code files selected for compilation are cached in a memory after compilation for subsequent execution.

12. A server comprising a transmitter adapted to transmit byte code files containing byte code to a receiving terminal and grouping information relating to the grouping of byte code files wherein the grouping information is transmitted specifically for the purpose of specifying groups of byte code files whereby the byte code files are selected for compilation into native code as a function of the grouping of byte code files, wherein interpretation, compilation or execution of one byte code file in a group triggers compilation of another byte code file in that group.

13. A server according to claim 12 wherein the grouping information relates to the directory structure of the byte code files as stored at the server whereby a single group relates to a single directory.

14. A server according to claim 13 wherein the grouping information comprising file locations appended to the file name of each respective byte code file.

15. A server according to claim 12 adapted to transmit the byte code files to the receiving terminal using a broadcast carousel.

16. A receiving terminal comprising a receiver adapted to receive both byte code files containing byte code and grouping information relating to the grouping of byte code files from a server, and a compiler for compiling the byte code files received at the receiving terminal to native code, wherein the byte code files are selected for compilation as a function of the grouping of byte code files, wherein interpretation, compilation or execution of one byte code file in a group triggers compilation of another byte code file in that group.

17. A receiving terminal according to claim 16 wherein the grouping information relates to the grouping of the byte code files as received by the receiver.

18. A receiving terminal according to claim 17 wherein the grouping information is defined using the Digital Storage Media Command and Control (DSM-CC) protocols of the Digital Video Broadcasting's Multimedia Home Platform standard.

19. A receiving terminal according to claim 16 wherein the grouping information defines the directory structure to be used to store the byte code files at the receiving terminal whereby a single group relates to a single directory.

20. A receiving terminal according to claim 19 wherein the grouping information comprising file locations appended to the file name of each respective byte code file.

21. A receiving terminal according to claim 19 wherein the byte code files are grouped in directories, and the byte code files within a particular directory selected for compilation are done so upon the interpretation, compilation or execution of other byte code files residing in that same directory.

22. A receiving terminal according to claim 16 wherein the byte code files selected for compilation are cached in a memory after compilation for subsequent execution.

* * * * *